United States Patent [19]
Hirata et al.

[11] Patent Number: 5,193,711
[45] Date of Patent: Mar. 16, 1993

[54] IN-MOLD LABELED CONTAINER AND METHOD FOR MAKING SUCH CONTAINER

[75] Inventors: Masanori Hirata, Tachikawa; Kohji Maekawa, Kawagoe; Ken Katayama, Tokyo; Koubu Mizukoshi, Kiyose, all of Japan

[73] Assignees: Snow Brand Milk Products Co., Ltd., Hokkaido; Nippla Co., Ltd., Tokyo, both of Japan

[21] Appl. No.: 776,280

[22] PCT Filed: May 1, 1991

[86] PCT No.: PCT/JP91/00596
§ 371 Date: Nov. 27, 1991
§ 102(e) Date: Nov. 27, 1991

[87] PCT Pub. No.: WO91/17036
PCT Pub. Date: Nov. 14, 1991

[30] Foreign Application Priority Data
May 7, 1990 [JP] Japan .................................. 2-117992

[51] Int. Cl.⁵ .............................................. B29C 51/10
[52] U.S. Cl. ..................... 220/453; 425/503; 425/504; 229/1.5 B
[58] Field of Search ............... 220/669, 453, 454, 460; 425/503, 504; 229/1.5 B

[56] References Cited
U.S. PATENT DOCUMENTS

| | | | |
|---|---|---|---|
| 3,533,135 | 10/1970 | Christensson | 425/504 |
| 3,561,629 | 2/1971 | Turner | 220/453 X |
| 3,580,473 | 5/1971 | Gill | 229/1.5 B X |
| 4,401,232 | 8/1983 | Constable et al. | 229/1.5 B X |
| 4,702,390 | 10/1987 | Rinkovsky | 220/453 |
| 5,043,130 | 8/1991 | Fujio | 425/503 X |

*Primary Examiner*—Steven M. Pollard
*Attorney, Agent, or Firm*—Griffin Butler Whisenhunt & Kurtossy

[57] ABSTRACT

A label comprising a bottom wall section and side wall sections has cuts formed into respective said side wall sections which extend along extensions of opposite side edges of said bottom wall section. There are provided folding lines extending between forward ends of the respectively paired cuts transversely thereof and/or cutouts intermittently arranged on imaginary lines corresponding to respective said folding lines so that said side wall sections may be folded upwardly with respect to said bottom wall section to define a lower end of the label located below the inner bottom surface of the container in the proximities of respective curved corners. A mold consisting of a core and a cavity is loaded with the label and then the in-mold labeling operation is carried out with injected resin.

A surface of the mold core may be provided with injected resin guide grooves or the like to form thickened areas extending along the label folds or along the inner surface of the container's bottom.

10 Claims, 13 Drawing Sheets

IN-MOLD LABELED CONTAINER AND METHOD FOR MAKING SUCH CONTAINER

TECHNICAL FIELD

The present invention relates to an in-mold labeled container and a method for making such container.

BACKGROUND ART

There have been available various methods such as direct printing, shrink wrapping and label adhering to achieve a decorative effect, a content indication etc. for a container after the container has been injection molded.

Figure 16:
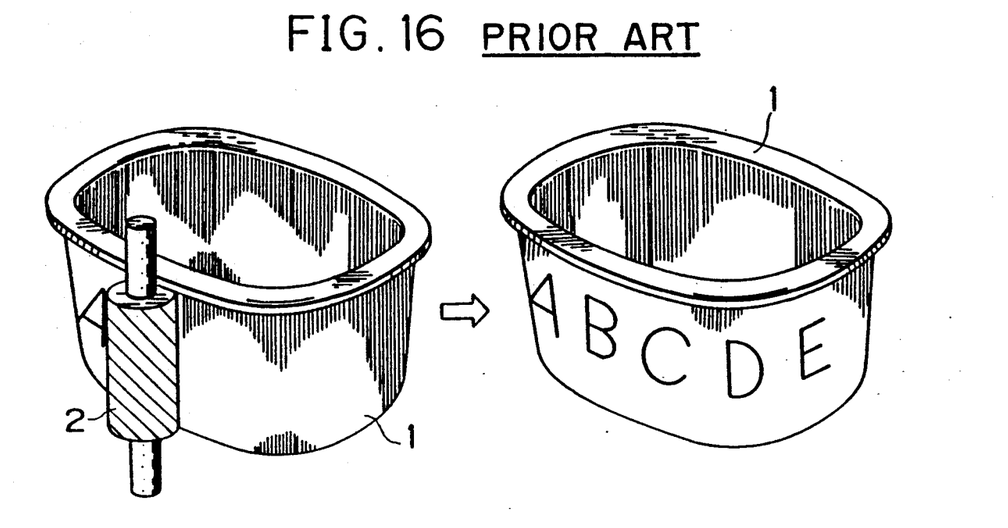
FIGS. 16, 17, 18, 19 and 20 illustrate manners according to the conventional methods of direct printing, shrink wrapping, label adhering, in-mold labeling and another in-mold labeling method in which opposite side edges of the label are joined together by synthetic resin, respectively.
Figure 17:
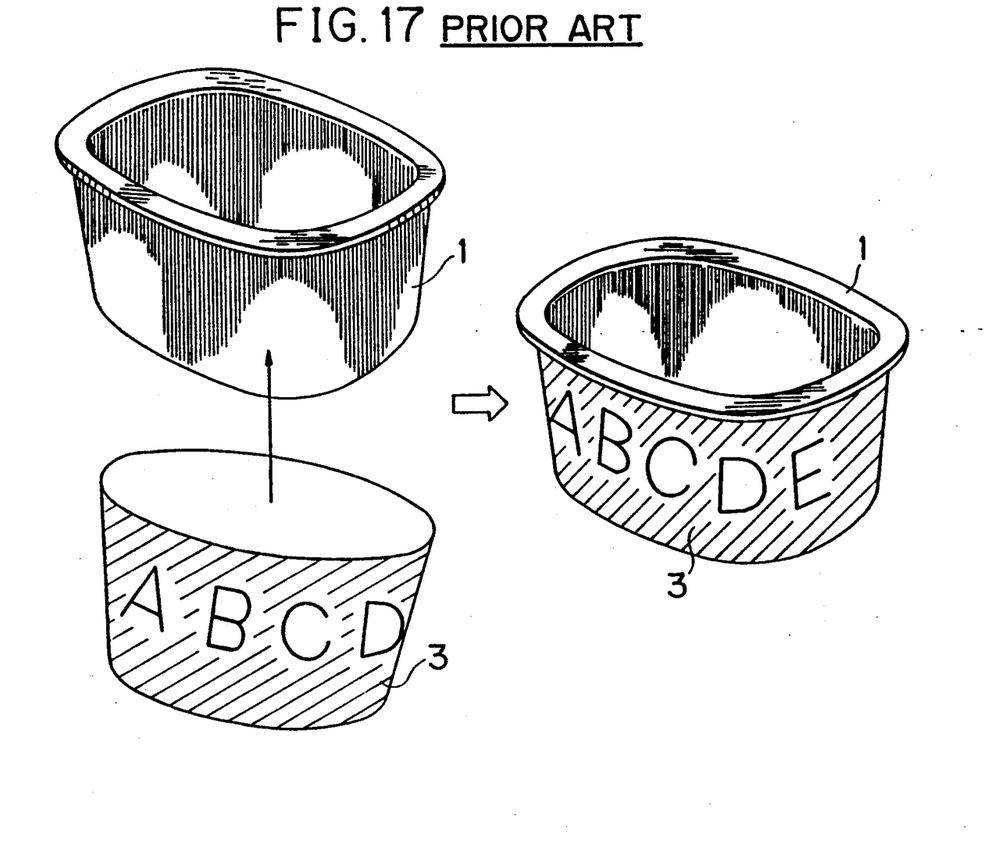
Figure 18:
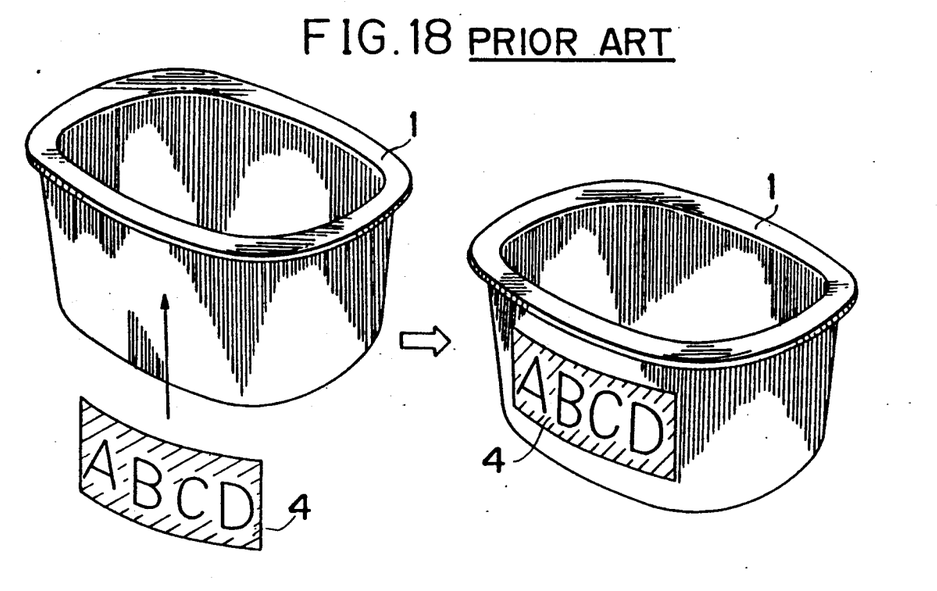

The direct printing method is to roll a printing roller (2) directly on the side wall of the container (1) as illustrated by FIG. 16, the shrink wrapping method is to wrap the container (1) with shrinkable film (3) as illustrated by FIG. 17 and the label adhering method is to stick a printed label (4) on the container (1) as illustrated by FIG. 18, respectively of the attached drawings.

Figure 19:
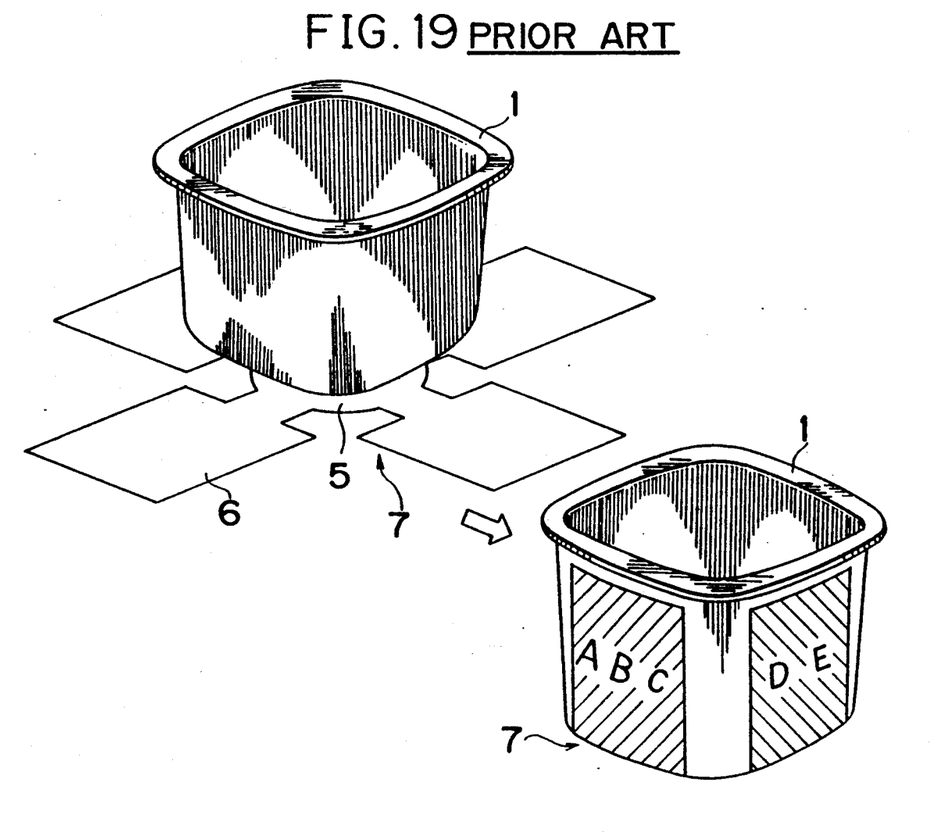

The conventional in-mold labeling method for the injection molded container is generally to load a label (7) comprising a bottom wall section (5) and side wall sections (6) into an injection mold and then to effectuate desired labeling with injected resin, as illustrated by FIG. 19. The alternative method is also well known, according to which the opposite side edges (6a), (6a) of the label (7) are joined to each other with synthetic resin as illustrated by FIG. 20.

However, the direct printing method as illustrated by FIG. 16 is disadvantageously poor in its expressive effect, the shrink wrapping method as illustrated by FIG. 17 requires a secondary process with a result of an increased cost, and the label adhering method as illustrated by FIG. 18 also requires a secondary process and correspondingly increases a cost.

As far as a need for the secondary process is concerned, the in-mold labeling method has been more advantageous than the remainder methods as illustrated by FIGS. 16, 17 and 18, respectively, since the labeling and the container molding simultaneously occur and therefore no secondary process has been required. However, the conventional in-mold labeling method has been accompanied with unsolved problems as will be described. For example, the conventional method of in-mold labeling has been effective for a cubic container having a side wall consisting of plane surfaces as seen in FIG. 19 but ineffective for a container having a curved side wall. For a legged container, it has been difficult for the conventional method of in-mold labeling to achieve the labeling on respective projecting legs for the structural reason.

Figure 20:
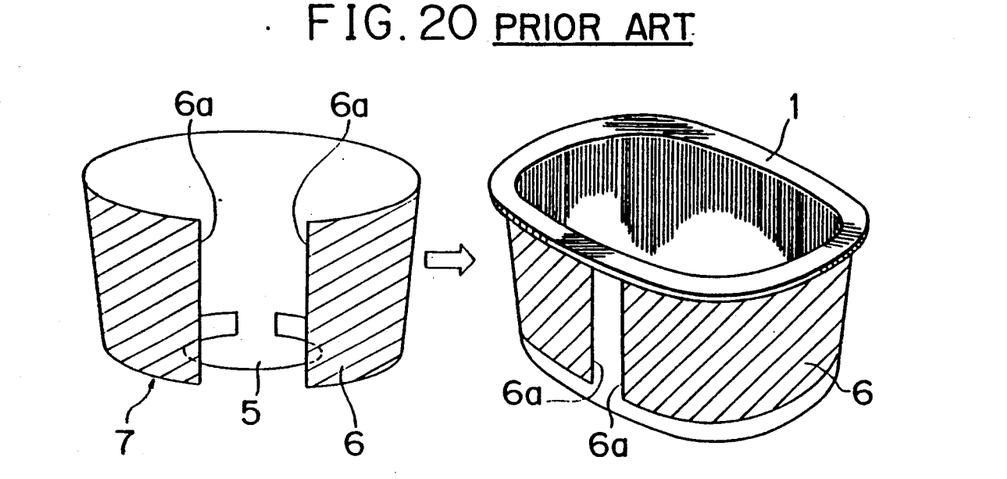

With the method of FIG. 20, according to which the opposite side edges of the label are joined to each other, it has certainly been possible to provide even the curved surfaces with the desired labeling but the label has had to be relatively thick to accommodate the joining process, with a result of an increased cost.

Figure 21A:
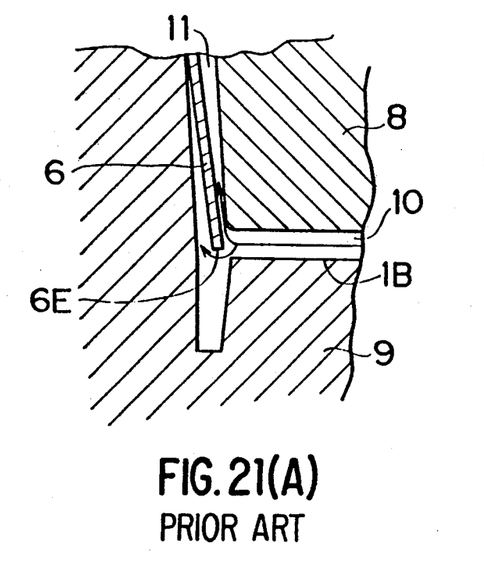
FIGS. 21(A) and (B) are a sectional view illustrating a relationship between a lower end of the label at a curved corner thereof and the mold during the conventional in-mold labeling and a perspective view of the container, illustrating a manner in which injected resin is partially forced out onto the outer side of the label in the vicinity of the curved corner.

According to the conventional method of in-mold labeling for the legged container, as will be apparent from FIG. 21 (A), a flow of injected resin as indicated by arrows occurs in the proximities of respective curved corners during flowing from a passage (10) to a passage (11) both defined between a core (8) and a cavity (9) of the mold and consequently a partial quantity of injected resin is apt to be forced out onto an outer surface of the label's side wall (6), because a lower end (6E) of the label's side wall (6) is at a level higher than the container's bottom (1B) in the proximities of the respective curved corners of the container (1). With a disadvantageous consequence, a partial quantity of injected resin has often been forced out onto the outer surface of the label or the label has often been creased with wrinkles.

Accordingly, it is a principal object of the invention to provide a method of in-mold labeling allowing the side wall of a container composed of curved surfaces alone or of curved surfaces and plane surfaces to be provided with in-mold labeling by forcing a label against a cavity side of the mold under an effect of the resin flow and the container produced by this method.

DISCLOSURE OF INVENTION

To achieve the object set forth above, the present invention resides in an in-mold labeled container comprsing a container and a label which is in-mold labeled on the outer side of the container's curved side wall, said label having a configuration comprising a bottom wall section and side wall sections, cuts formed into respective said side wall sections which extend from respective boundaries between said side and bottom wall sections along extensions of opposite side edges of said bottom wall section and folding lines extending between forward ends of the respectively paired cuts transversely thereof and/or cutouts intermittently arranged on imaginary lines corresponding to respective said folding lines, wherein a lower end of the label in-molded on the outer side of the container's side wall along curved corners is at a level at least lower than the inner bottom surface of the container and also in a method for making such container.

A surface of the mold core with the container's bottom may be provided with grooves or the like serving to direct or guide a flow of injected resin so as to form thickened areas extending along the respective label folds or along the inner surface of container's bottom.

An important feature of the invention lies in that the label comprising the bottom wall section and the side wall sections is formed into the respective side wall sections which extend from the respective boundaries between the side and bottom wall sections along extensions of the opposite side edges of the bottom wall section and these cuts are utilized to fold the side wall sections upward with respect to the bottom wall section so as to facilitate a smooth flow of injected resin in the proximities of said boundaries. Another important feature lies in that the core or the cavity is formed with grooves or the like for positively guiding the flow of inujected resin. Thus, the label is forced by the flow of injected resin against the cavity side of the mold and no quantity of injected resin is forced out onto the outer side of the label. These features of the invention allow also a container having a side wall composed of curved surfaces alone or of curved surfaces and plane surfaces to be effectively provided with desired in-mold labeling. Furthermore, whether a container has its bottom of a legged or legless configuration, the container can be effectively in-mold labeled merely by adjusting at cut depth. Moreover, the present invention allows a variety of materials to be used for in-mold labeling and an in-mold labeled container to be molded at a rational cost.

BRIEF DESCRIPTION OF DRAWINGS

FIGS. 5(A) and (B) are a sectional view of a mold having projections on the cavity side to control the flow of injected resin along the container bottom and a perspective view of a legless container thus molded, respectively;

BEST MODE FOR CARRYING OUT THE INVENTION

The present invention will be described by way of prepared embodiments shown by the attached drawings.

Figure 1A:
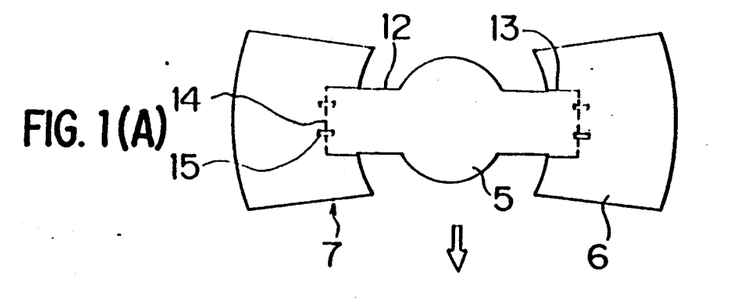
FIGS. 1(A) and (B) are a developed view showing, by way of example, an in-mold label according to the invention and a perspective view showing said label as erected for loading into a mold, respectively.

Referring to FIG. 1, configuration of a label (7) functioning to guide a flow of injected resin according to the teachings of the invention is shown. As will be apparent from FIG. 1(A), a pair of label's side wall sections (6) are connected by a corresponding pair of connector bands (12) integrally with a label's bottom wall section (5). Each of the label's side wall sections (6) presents a fan-shape. The label's side wall section (6) is provided with cuts (13) extending along extensions of opposite side edges of the associated connector band (12). It is optional to provide the side wall section (6) with a folding line (14) connecting forward ends of the respective cuts (13) or with cutouts (15) intermittently arranged on an imaginary line corresponding to said folding line or with both said fording line (14) and said cutouts (15).

Figure 3A:
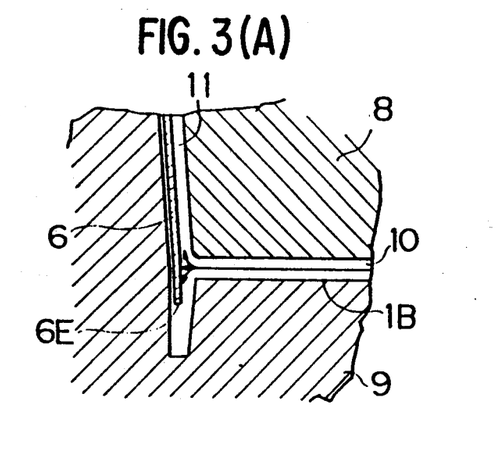
FIGS. 3(A) and (B) are a sectional view of a mold, indicating by arrows how injected resin flows around a curved corner of the container's side wall when the label as shown by FIGS. 1(A) and (B) is in-molded on a legged container and a perspective view of the legged container thus molded, respectively.
Figure 3B:
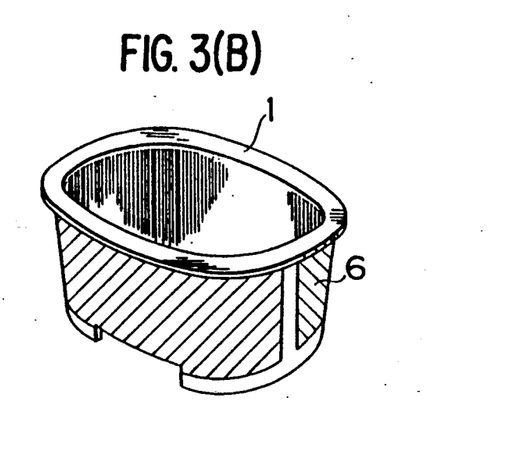
Figure 4A:
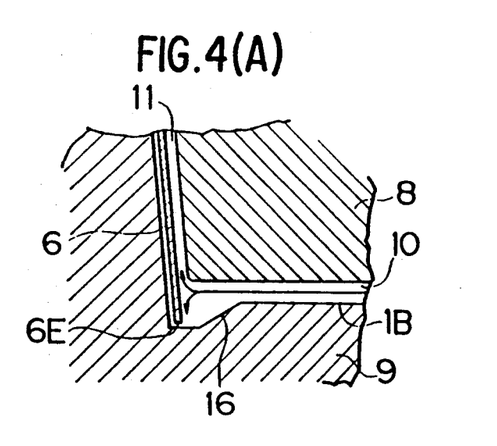
FIGS. 4(A) and (B) are a sectional view of a mold, indicating by arrows how injected resin flows around a curved corner of the container's side wall when the label as shown by FIGS. 1(A) and (B) is in-molded on a legless container and a perspective view of the legless container thus molded, respectively.
Figure 4B:
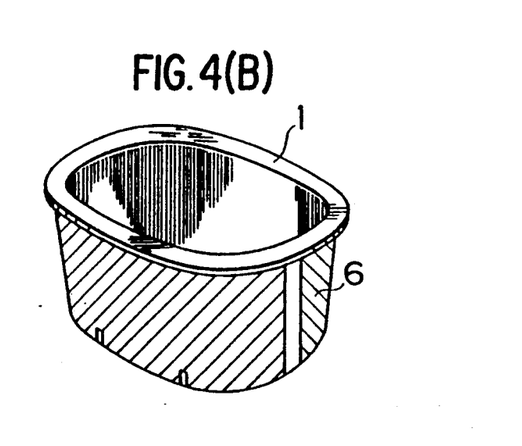
Figures 5A, 5B:
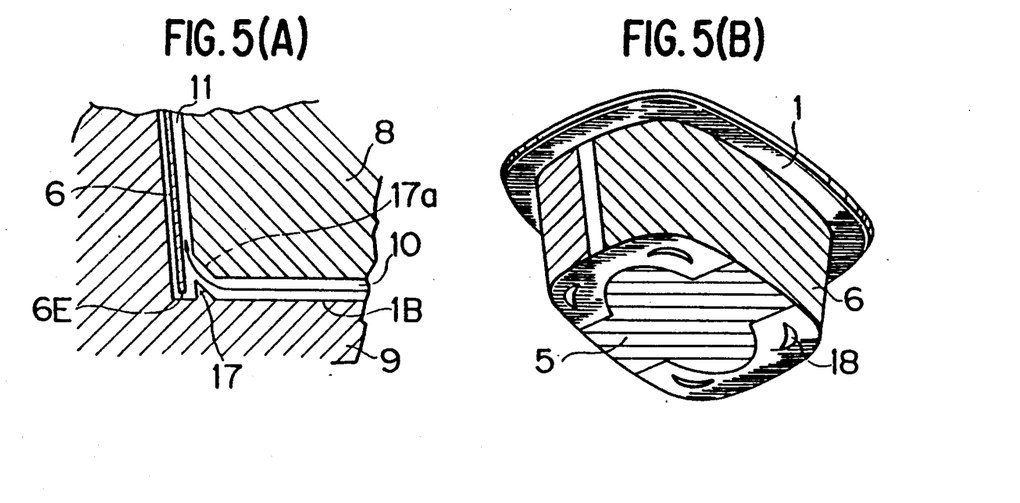

FIGS. 3 through 5 illustrate by way of example how the side wall of the container (1) is molded adjacent each curved corner.

Figure 21B:
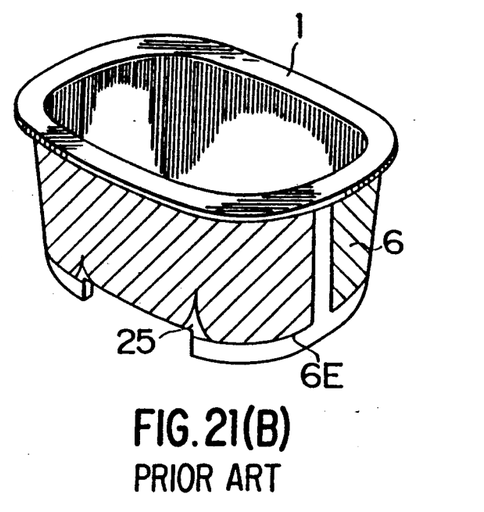

Referring to FIG. 3, the container (1) is legged and the curved corner is constructed so that the label's side wall section (6) extends downwards beyond a bottom (1B) of the container (1) to a lower end (6E) and injected resin flowing from a passage (10) to a passage (11) is guided by the label's side wall section (6) as indicated by arrows. In this manner, no quantity of injected resin is forces out onto the outer surface of the label. Such arrangement corresponds to an improvement of the conventional arrangement shown by FIG. 21.

While the case of the legged container has been described above in reference with FIG. 3, a depth of the cuts (13) may be appropriately adjusted to accommodate the case of a legless container.

Referring to FIG. 4, the container is legless and the cavity side is formed in the proximity of each curved corner with a downward slope (16) at which the passage (10) and the passage (11) intersect each other. In this arrangement also, the label's side wall section (6) extends downward beyond the container's bottom (1B) to the lower end (6E) and thereby the lower end (6E) of the label is stabilized on the cavity side.

The container molded in the manner as has been described is shown by FIG. 4(B).

Now referring to FIG. 5, here is also shown a legless container but the cavity is formed in the proximity of each curved corner with a projection (17) having a triangular cross-section and the core (8) is correspondingly provided with an upwardly slanting cut surface (17a). In such arrangement, injected resin is guided by the label as indicated by arrows and the label is tightly stabilized against the cavity side even when the lower end (6E) of the label is at a level above the container's bottom (1B).

FIG. 5(B) shows the bottom of the container molded in the manner as has been described above. Reference numeral (18) designates grooves formed by the respective triangular cross-sectioned projections (17).

Figure 1B:
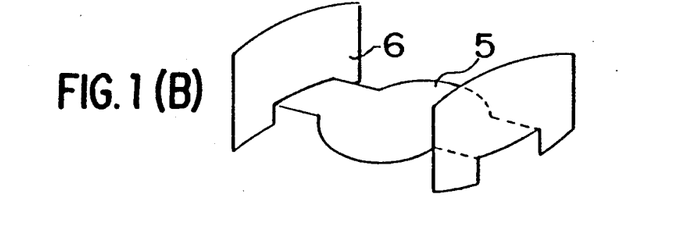
Figure 2A:
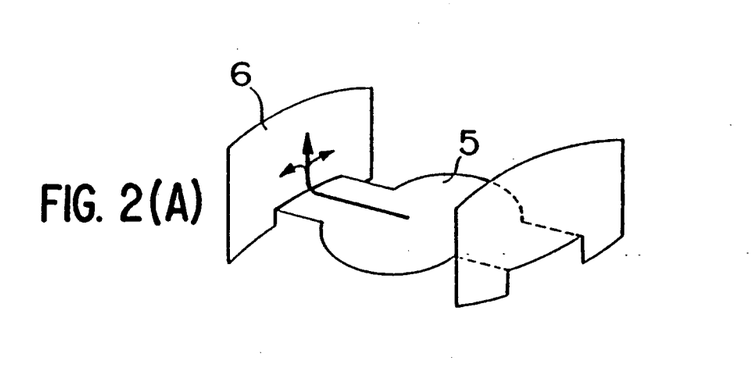
FIGS. 2(A) and (B) are a perspective view of the in-mold label as shown by FIG. 1 and a sectional view of a mold loaded with said label, respectively, both views indicating by arrows how injected resin flows when said label has been loaded into the mold.
Figure 2B:
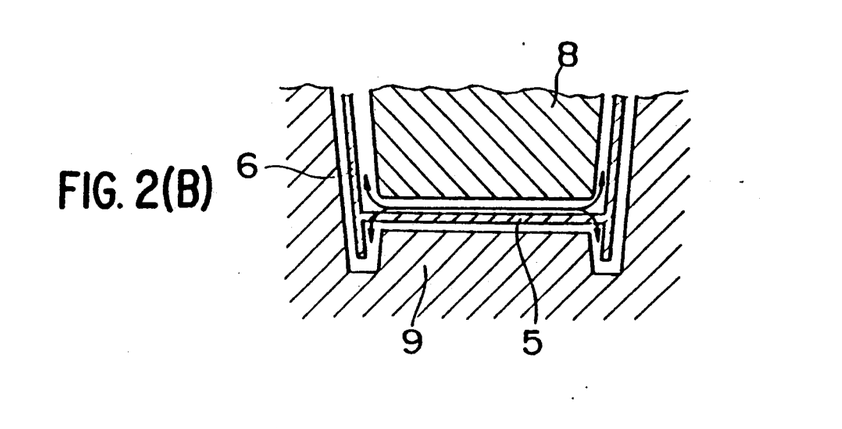

The label (7) is erected by folding the label's side wall sections (6) upwardly along the folding lines (14) or the lines on which the cutouts (15) are intermittently arranged as shown by FIG. 1(B), then the erected label is loaded into the mold with the label's bottom wall section (5) ahead and injection resin is introduced into a space defined between the core and the cavity of the mold. Injected resin flows along label's bottom wall section (5) as indicated by the arrows in FIGS. 2(A) and (B) and around each curved corner as indicated by the arrows in FIG. 3(A).

To load the mold with the label, the core and the cavity are opened, and then the developed label is forced into the cavity so as to be folded closely against the inner wall of the cavity. Resin injected into the space between the core (8) and the cavity (9) is unified with the label, allowing the label to be tightly bonded to the outer side of the container's side wall consisting of plane and curved surfaces.

The above-mentioned feature such that the lower end of the label's side wall section (6) is at a level lower than the inner bottom surface (1B) of the container (1) permits injected resin to force the label's side wall section (6) closely against the cavity side so that the label may be reliably bonded to the curved outer surface of the container.

As will be understood from the foregoing description, the cuts (13) and the cutouts (15) effectively function not only to prevent the label from being creased with wrinkles but also to prevent injected resin from flowing into a space which otherwise would be formed between the cavity and the label. Provision of the cutouts (15) facilitates the label to be folded.

The injection molded container of the invention may be made from soft or hard thermosplastic synthetic resin such as polypropylene (PP), polyethylene (PE), polystyrene (PS) and polyester (PET), and the container may present various cross-sectional shapes such as square, rectangular, circular, oval and polygonal shapes.

The label for molding of the in-mold labeled container may be of normal paper (inclusive of newspaper), coated paper, plastic film, synthetic paper or the like so far as a label cut out from such material can be maintained in its developed condition. Specifically, the printed label of such material is previously cut out into a configuration having given bottom wall section and side wall sections so as to be properly loaded into a mold of a predetermined configuration defined by a combination of plane and curved surfaces.

Various types of label thus cut out will be exemplified in reference with FIGS. 6, 7, 8 and 9.

Referring to FIG. 6, there is illustrated an embodiment of two-way label to be used with a legged container. FIG. 6(A) shows a two-way label provided with the folding lines (14) and the cuts (13), which is used for molding of an in-mold labeled container as shown by FIGS. 6(C) or (D). FIG. 6(C) shows an oblong container in-mold labeled with such two-way label and FIG. 6(D) shows a cubic container in-mold labeled with such two-way label.

Figure 6A:
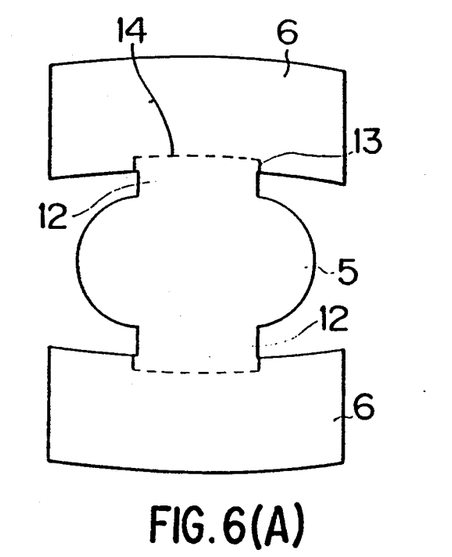
FIGS. 6(A) and (B), (C), and (D) illustrate embodiments of two-way label used for the legged container, FIG. 6(A) being a developed view of the label provided with a folding line and cuts, FIG. 6(B) being a developed view of the label provided with cutouts and cuts, FIG. 6(C) being a perspective view of an oblong container in-mold labeled with such two-way label and FIG. 6(D) being a perspective view of a cubic container in-mold labeled with such two-way label.
Figure 6B:
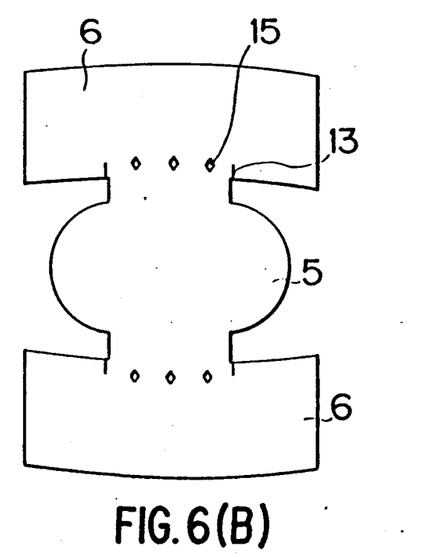
Figure 6C:
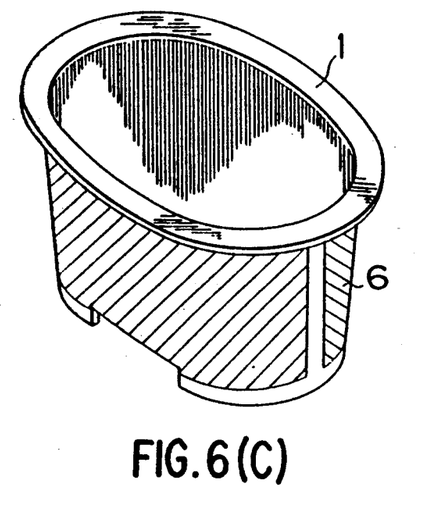
Figure 6D:
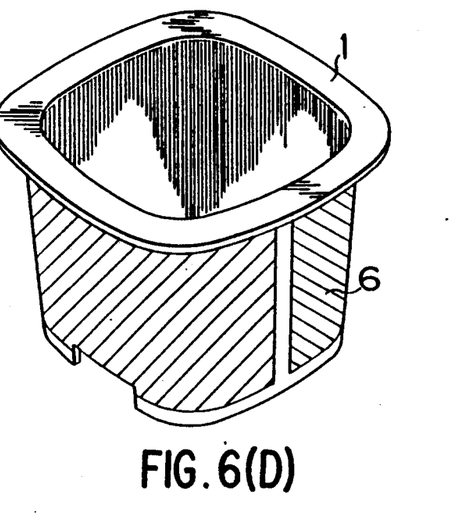

FIG. 6(B) shows a two-way label provided with the cutouts (15) and the cuts (13), which is used for molding of said in-mold labeled container as shown by FIGS. 6(C) or (D). The specific embodiment shown by FIG. 6(B) employs the diamond-shaped cutouts (15).

Figure 7A:
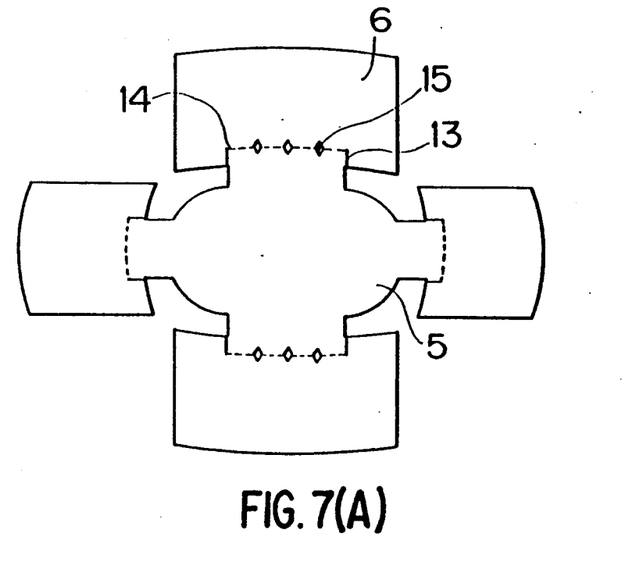
FIGS. 7(A), (B) and (C) illustrate an embodiment of four-way label used for the legged container, FIG. 7(A) being a developed view of the label provided with cuts, folding lines and cutouts, FIG. 7(B) being a perspective view of an oblong container in-mold labeled with such four-way label and FIG. 7(C) being a perspective view of a cubic container in-mold labeled with such four-way label.
Figure 7B:
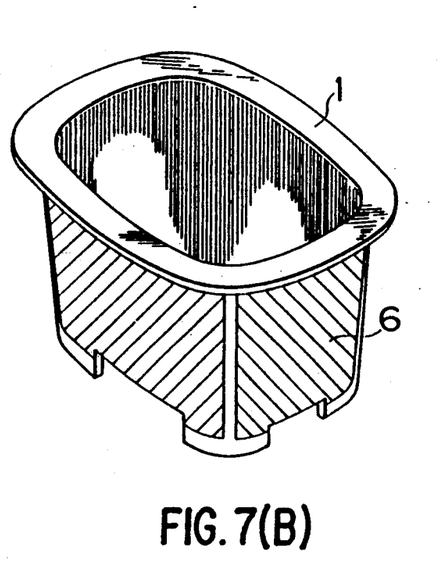
Figure 7C:
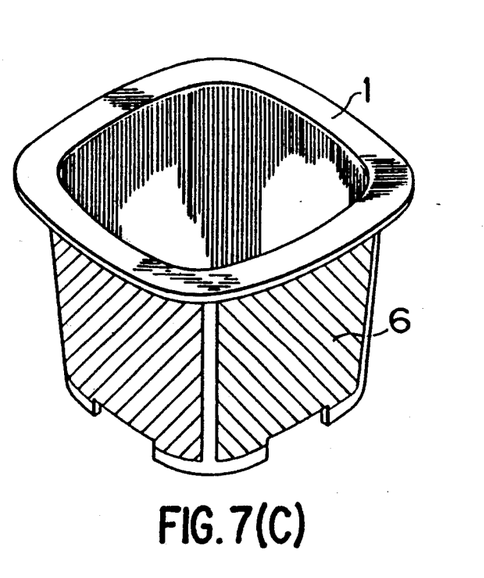

Referring to FIG. 7, there is illustrated an embodiment of four-way label to be used with a legged container, which is provided with the cuts (13), the folding lines (14) and the cutouts (15). FIG. 7(B) shows an oblong container in-mold labeled with such four-way label and FIG. 7(C) shows a cubic container in-mold labeled with such four-way label.

FIGS. 8 and 9 illustrate embodiments of the label both to be used with a legless container. FIG. 8(A) shows a two-way label provided with the folding lines (14) and the cuts (13), which is used to obtain an in-mold labeled container as shown by FIGS. 8(C) or (D). FIG. 8(C) shows an oblong container in-mold labeled with such two-way label and FIG. 8(D) shows a cubic container in-mold labeled with such two-way label.

Figure 8A:
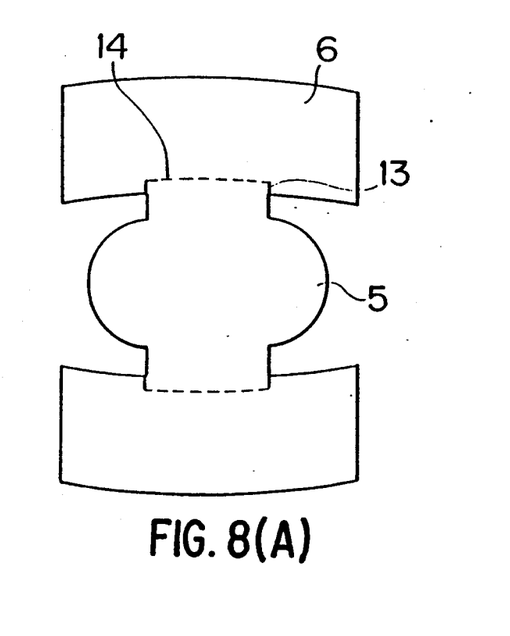
FIGS. 8(A), (B), (C), (D), (E) and (F), illustrate embodiments of two-way label used for the legless container, FIG. 8(A) being a developed view of the label provided with folding lines and cuts, FIG. 8(B) being a developed view of the label provided with cutouts and cuts, FIGS. 8(C) and (D) being perspective views of oblong and cubic containers in-mold labeled with such two-way label as shown by FIG. 8(A), respectively, and FIGS. 8(E) and (F) being perspective views of oblong and cubic containers in-mold labeled with such two-way label as shown by FIG. 8(B), respectively.
Figure 8B:
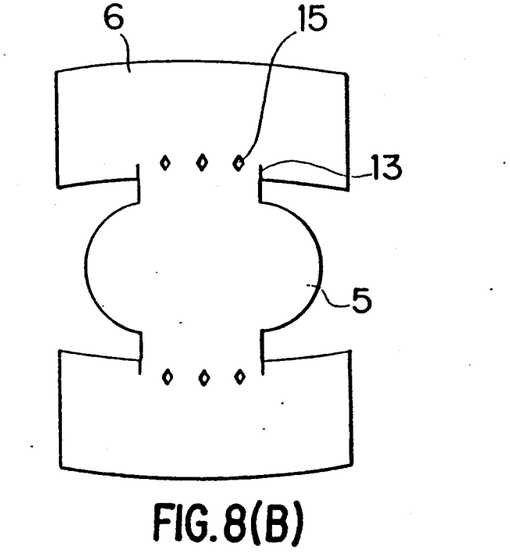
Figures 8C, 8D:
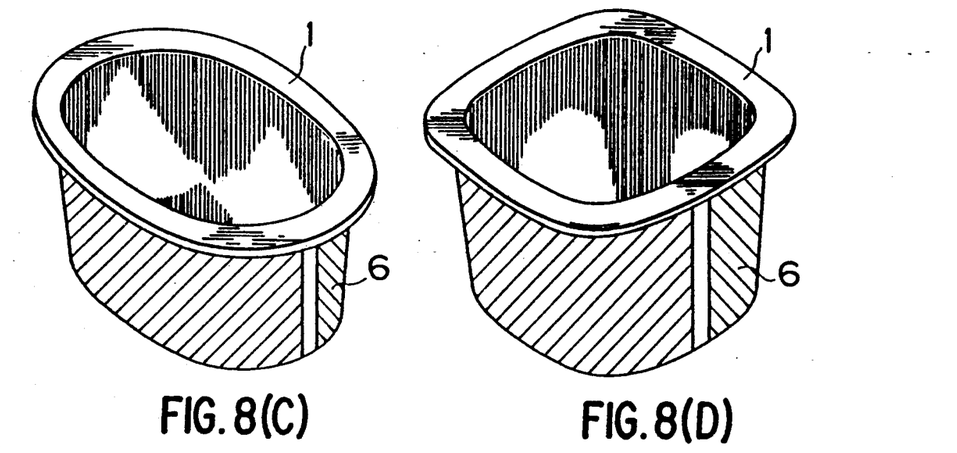
Figure 8E:
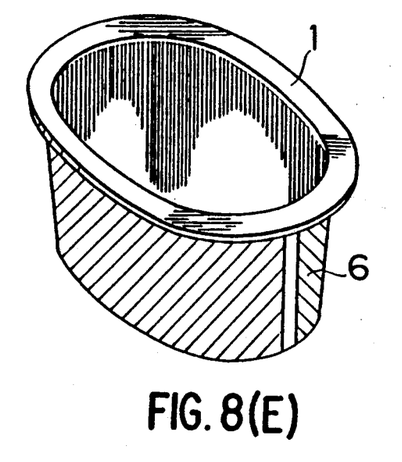
Figure 8F:
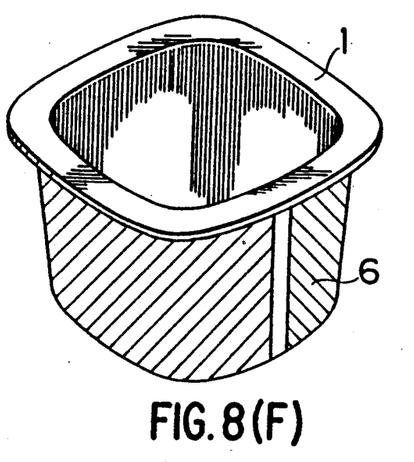

FIG. 8(B) shows a two-way label provided with the cutouts (15) and the cuts (13) to be used to obtain an in-mold labeled container as shown by FIGS. 8(E) or (F). FIG. 8(E) shows an oblong container in-mold labeled with such two-way label and FIG. 8(F) shows a cubic container in-mold labeled with such two-way label.

Figure 9A:
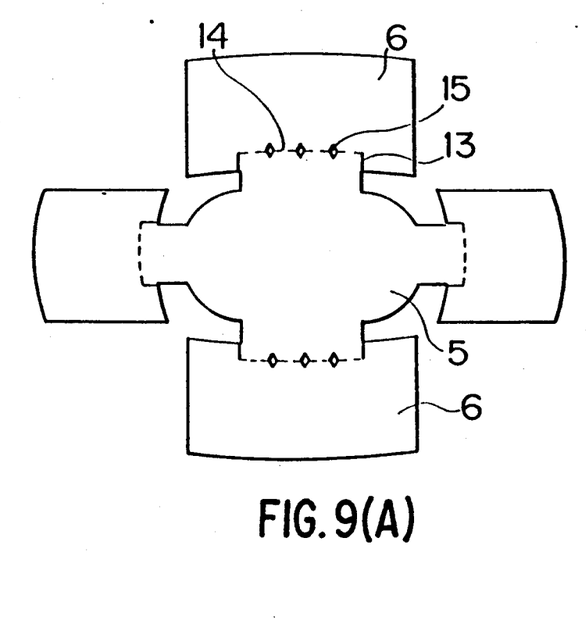
FIGS. 9(A), (B) and (C) illustrate an embodiment fp four-way label used for the legless container, FIG. 9(A) being a developed view of the label provided with folding line, cutouts and cuts, FIG. 9(B) being a perspective view of an oblong container in-molded labeled with such four-way label and FIG. 9(C) being a perspective view of a cubic container in-mold labeled with such four-way label.
Figure 9B:
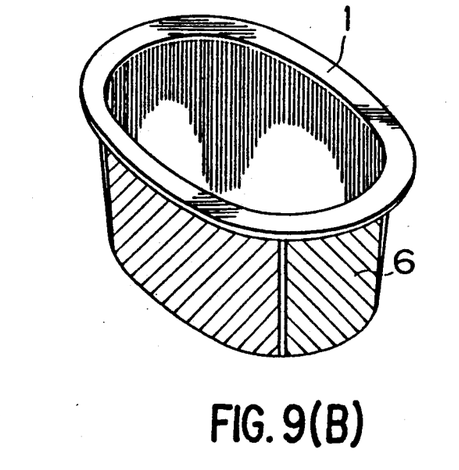
Figure 9C:
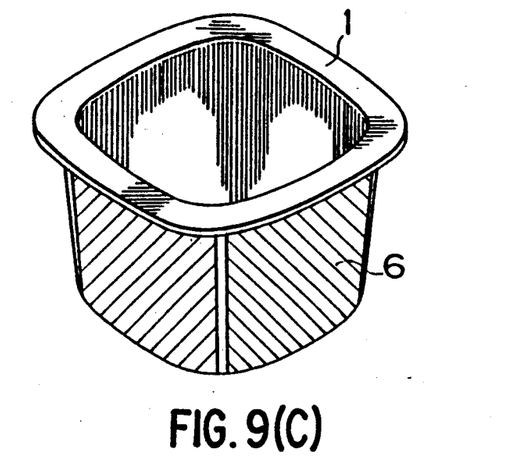

FIG. 9 illustrates an embodiment of four-way label to be used with a legless container, which is provided, as shown by FIG. 9(A), with the cutouts (15), the folding lines (14) and the cuts (13). FIG. 9(B) shows an oblong container in-mold labeled with such four-way label and FIG. 9(C) shows a cubic container in-mold labeled with such four-way label.

After the label of the above-mentioned construction has been loaded into the mold, resin is injected into the mold through an inlet port with the label within the mold being held in close contact with the cavity side so that most of resin injected through said inlet port may flow along the inner side of the label and thereby the label may be forced closely against the cavity side. Preferably, the core (8) is provided with a suitable groove to assure that resin injected through the inlet port is preferentially directed to the inner side of the label.

Figure 10A:
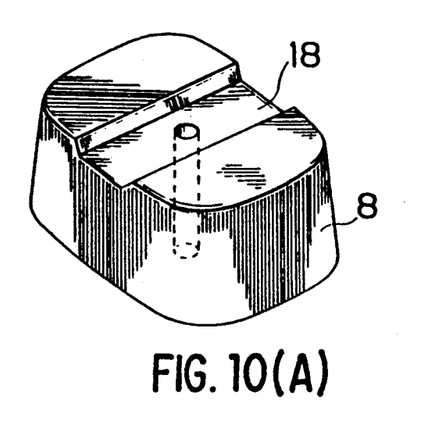
FIGS. 10(A) and (B) are perspective views of cores provided with a single linear groove and a cross-shaped groove, respectively.
Figure 10B:
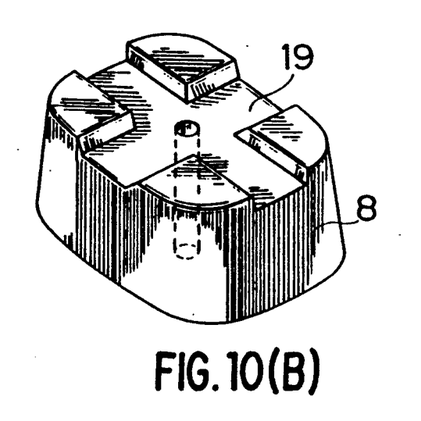
Figure 11:
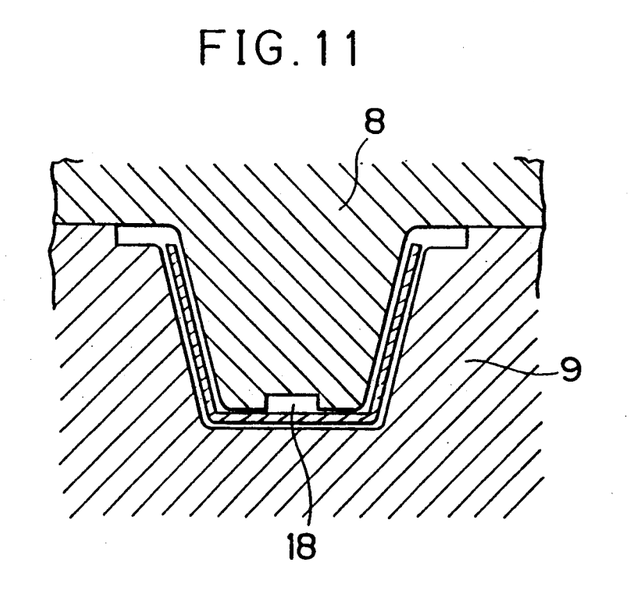
FIG. 11 is a sectional view illustrating a process of molding by use of the core as shown by FIG. 10 and the cavity associated with this core.

Said groove will be discussed by way of example in reference with FIGS. 10(A), (B) and 11. The core (8) may be formed with a single linear groove (18) as shown by FIG. 10(A) or a cross-shaped groove (19) as shown by FIG. 10(B) to achieve positive supply of resin to the inner side of the label and thereby to mold the label on the curved outer side of the container with a high stability.

Figure 12:
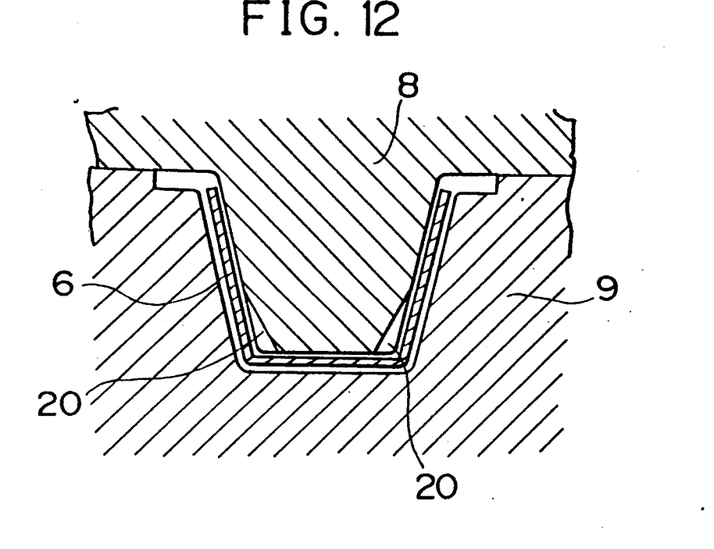
FIG. 12 is a sectional view illustrating a relationship between a mold having the core formed on its bottom with cut surfaces and the label.

In order to direct the flow of resin injected through the inlet port into the mold preferentially toward the inner side of the label, there is available another measure as illustrated by FIG. 12, according to which the areas of the label to be folded are made thicker than the rest so that injected resin may force the label's side wall from the inner side thereof against the cavity side along said thicker areas. The label can be thereby forced tightly against the cavity side for properly molding the label on the curved outer side of the container.

Figure 13:
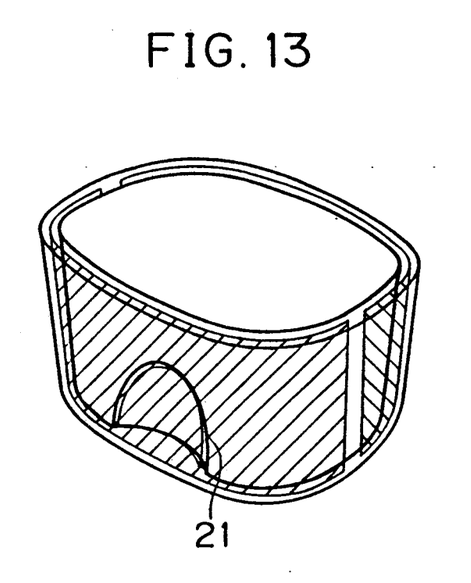
FIG. 13 illustrates how injected resin flows into the arrangement as shown by FIG. 12.

Referring to FIG. 12, reference numeral (20) designates cut surfaces provided in the core (8) to form the above-mentioned thicker areas and reference numeral (21) in FIG. 13 designates these thicker areas. Such arrangement promotes injected resin to flow along the cut surfaces (20) of the core (8).

Figure 14A:
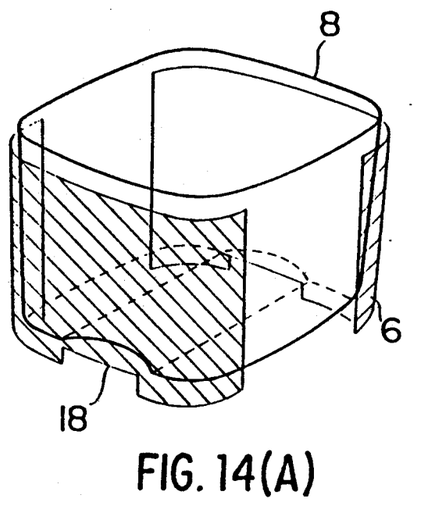
FIGS. 14(A) and (B) illustrate a relationship between the core and the label, FIG. 14(A) relating to the core having cut surfaces formed at opposite ends of the single linear groove and FIG. 14(B) relating to the core having cut surfaces formed at respective ends of the cross-shaped groove.
Figure 14B:
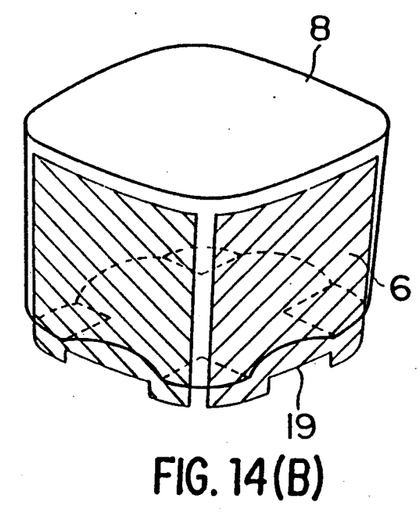

FIG. 14(A) illustrates a relationship between the core (8) and the two-way label (6), said core having the single linear groove (18) provided at respective ends with cut surfaces, and FIG. 14(B) illustrates a relationship between the core (8) and the four-way label (6), said core having the cross-shaped groove (19) provided at respective ends with cut surfaces. These cut surfaces are useful for positively directing injected resin toward the inner side of the label.

Figure 15A:
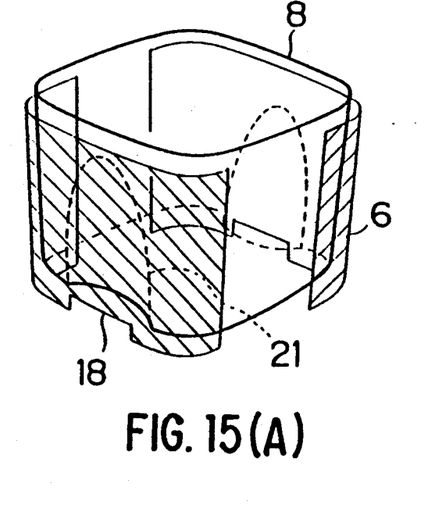
FIGS. 15(A) and (B) illustrate the resin flow occurring in the arrangement as shown by FIGS. 14(A) and (B), respectively.
Figure 15B:
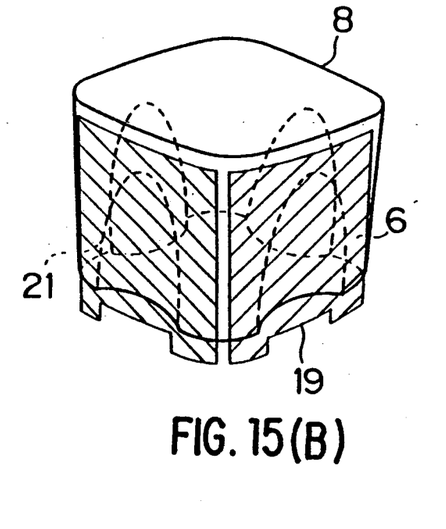

FIGS. 15(A) and (B) illustrate a relationship between the core (8) and the label (6) by indicating the resin flow occurring in the arrangement of FIGS. 14(A) and (B), respectively.

It will be understood from the foregoing detailed description, the core side of the mold is preferably provided at locations corresponding to the bottom and side walls of the container with the grooves and the cut surfaces serving to control the resin flow so that the label to be prevented from being creased with wrinkles may be properly molded on the outer surface of the container's side wall during injection of resin into the mold.

In this way, the method of the present invention causes the flow of injected resin to force the label tightly against the cavity side and thereby allows the outer side of the container's side wall to be provided over the areas comprising the curved surfaces alone or comprising both the curved and plane surfaces with the desired in-mold labeling. It should be understood, however, that the invention is not limited to the specific embodiments as have been described and illustrated hereinabove.

INDUSTRIAL APPLICABILITY

The present invention provides the container so arranged that the label may be forced by the flow of injected resin tightly against the cavity side of the mold and thereby the outer side of the container's side wall may be provided on the areas comprising the curved surfaces alone or comprising both the curved and plane surfaces with the desired in-mold labeling. The invention is applicable to various types of container, for example, those for foodstuffs and particularly useful for the containers for commodities to be provided with the content indication or the illustration so that these commodities may be easily discriminated from the other commodities.

What is claimed is:

1. In-mold labeled container comprising a container and a label which is in-mold labeled on the outer side of the container's curved side wall, said label having a configuration comprising a bottom wall section, side wall sections, cuts formed into respective said side wall sections which extend from respective boundaries between said side and bottom wall sections along extensions of opposite side edges of said bottom wall section and folding lines extending between forward ends of the respectively paired cuts transversely thereof and/or cutouts intermittently arranged on imaginary lines corresponding to respective said folding lines, wherein a lower end of the label in-mold labeled on the outer side of the container's side wall along curved corners is at a level at least lower than the inner bottom surface of the container.

2. In-mold labeled container as recited in claim 1, wherein each of said side wall sections having both the folding line extending between the forward ends of the paired cuts transversely thereof and the cutouts.

3. In-mold labeled container as recited in claim 1, wherein said boundaries between the bottom wall section and the respective side wall sections comprise connector bands.

4. In-mold labeled container as recited in claim 1, wherein areas of the label to be folded within a mold are thickened by injected resin guiding grooves or the like formed in a core surface associated with the container's bottom.

5. Method of making the in-mold labeled container as recited in claim 4 by loading an injection mold with a label and then in-mold labeling with injected resin, said method comprising a step of forming a core in the proximities of respective curved corners with slopes serving to guide a flow of injected resin toward the inner side of the label so as to stabilize the label on a cavity side.

6. In-mold labeled container as recited in claim 1, wherein the inner surface of the container's bottom is provided with a linear thickened area.

7. In-mold labeled container as recited in claim 6, wherein said linear thickened area is cross-shaped.

8. Method of making the in-mold labeled container as recited in claim 6 loading an injection mold with a label and then in-mold labeling with injected resin, said method comprising a step of providing a core side of the mold adjacent the container's bottom with grooves or the like serving to guide a flow of injected resin so that the preferential flow of injected resin may stabilize the label against the outer side of the container's side wall.

9. Method of making the in-mold labeled container as recited in claim 1 by loading an injection mold with a label and then in-mold labeling with injected resin, said method comprising steps of loading said mold consisting of a core and a cavity with said label having a configuration comprising a bottom wall section, side wall sections, cuts formed into respective said side wall sections which extend from respective boundaries between said side and bottom wall sections along extensions of opposite side edges of said bottom wall section and folding lines extending between forward ends of the respectively paired cuts transversely thereof and/or cutouts intermittently arranged on imaginary lines corresponding to respective said folding lines, folding said side wall sections upwardly with respect to said bottom wall section so as to form portions extending downward beyond the inner bottom surface of the container in the proximities of respective curved corners and forcing these portions of the label tightly against the cavity side under a pressure of injected resin.

10. In-mold labeled container comprising a container and a label which is in-mold labeled on the outer side of the container's side wall, said label having a configuration comprising a bottom wall section, side wall sections, cuts formed into respective said side wall sections which extend from respective boundaries between said side and bottom wall sections along extensions of opposite side edges of said bottom wall section and folding lines extending between forward ends of the respectively paired cuts transversely thereof, wherein the container is provided on the outer side of its bottom in the proximities of respective curved corners with grooves so that injected resin forces the label against the outer side of the container's side wall.

* * * * *